United States Patent
Iwamoto et al.

(10) Patent No.: US 7,167,919 B2
(45) Date of Patent: Jan. 23, 2007

(54) TWO-PASS DEVICE ACCESS MANAGEMENT

(75) Inventors: Neil Y. Iwamoto, Mission Viejo, CA (US); Attaullah Seikh, Irvine, CA (US); Jeanette Yang Paek, Cypress, CA (US); Martin Martinez, Huntington Beach, CA (US); Royce E. Slick, Mission Viejo, CA (US); Wei-Jhy Chern, Irvine, CA (US); Eliza Khosrova, Los Angeles, CA (US); Joseph Yang, Cypress, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 10/309,884

(22) Filed: Dec. 5, 2002

(65) Prior Publication Data

US 2003/0167336 A1    Sep. 4, 2003

Related U.S. Application Data

(63) Continuation-in-part of application No. 10/017,438, filed on Dec. 5, 2001.

(51) Int. Cl.
*G06F 15/16* (2006.01)

(52) U.S. Cl. .......................... 709/229; 710/8

(58) Field of Classification Search ............... 709/245, 709/227–229, 225, 203, 223, 224, 222; 375/141, 375/356; 713/200, 156, 193, 182, 168; 705/8, 705/10, 35, 53, 14, 26, 51, 401; 455/552, 455/412; 379/100, 230; 715/716; 358/1.9; 710/8, 315; 726/20; 707/100
See application file for complete search history.

(56) References Cited

U.S. PATENT DOCUMENTS 5,191,611 A * 3/1993 Lang ........................... 705/53

(Continued)

FOREIGN PATENT DOCUMENTS

EP    0 863 658    9/1998

(Continued)

OTHER PUBLICATIONS

Multi-Resolution Access Control Algorithm Based On Fractal..—Roche, Dugelay, Molva (1996) clip.informatik.uni-leipzig.de/toelke/Watermark/1499.pdf.*

(Continued)

*Primary Examiner*—Thong Vu
(74) *Attorney, Agent, or Firm*—Fitzpatrick, Cella, Harper & Scinto

(57) ABSTRACT

Access control to a networked peripheral device by a walk-up user, wherein the networked peripheral device is accessible by both the walk-up user and a remote user, based on centralized access management information. Access control comprises receiving authenticated information for the walk-up user from the networked peripheral device at a centralized location, determining at a server connected to the network a first level of access to the networked peripheral device, determining at the networked peripheral device a second level of access to the networked peripheral device by the walk-up user based on received access management information for the walk-up user, and allowing the walk-up user to access determined user-available features of the networked peripheral device based on the determined first and second levels of access.

15 Claims, 16 Drawing Sheets

U.S. PATENT DOCUMENTS

| | | | | |
|---|---|---|---|---|
| 5,671,354 | A | 9/1997 | Ito et al. | 395/187.01 |
| 5,774,551 | A * | 6/1998 | Wu et al. | 713/155 |
| 5,907,598 | A * | 5/1999 | Mandalia et al. | 379/100.01 |
| 5,923,756 | A * | 7/1999 | Shambroom | 713/156 |
| 5,968,124 | A * | 10/1999 | Takahashi et al. | 709/224 |
| 6,029,198 | A * | 2/2000 | Iizuka | 709/223 |
| 6,085,081 | A * | 7/2000 | Leskinen | 455/406 |
| 6,128,602 | A * | 10/2000 | Northington et al. | 705/35 |
| 6,161,185 | A | 12/2000 | Guthrie et al. | 726/5 |
| 6,202,092 | B1 | 3/2001 | Takimoto | 709/225 |
| 6,219,700 | B1 * | 4/2001 | Chang et al. | 709/222 |
| 6,378,070 | B1 | 4/2002 | Chan et al. | 713/155 |
| 6,498,912 | B1 | 12/2002 | Leni et al. | 399/79 |
| 6,557,049 | B1 * | 4/2003 | Maloy et al. | 710/8 |
| 6,587,873 | B1 * | 7/2003 | Nobakht et al. | 709/219 |
| 6,604,085 | B1 * | 8/2003 | Kolls | 705/14 |
| 6,625,258 | B1 * | 9/2003 | Ram et al. | 379/88.13 |
| 6,643,318 | B1 * | 11/2003 | Parsa et al. | 375/141 |
| 6,645,077 | B2 * | 11/2003 | Rowe | 463/42 |
| 6,674,537 | B2 | 1/2004 | Kadowaki | 358/1.15 |
| 6,674,545 | B1 * | 1/2004 | Atsumi | 358/1.9 |
| 6,678,515 | B1 * | 1/2004 | Gillespie et al. | 455/412.1 |
| 6,738,856 | B1 * | 5/2004 | Milley et al. | 710/315 |
| 6,785,728 | B1 * | 8/2004 | Schneider et al. | 709/229 |
| 6,789,126 | B1 * | 9/2004 | Saulpaugh et al. | 709/245 |
| 6,802,007 | B1 * | 10/2004 | Canelones et al. | 713/193 |
| 6,820,204 | B1 * | 11/2004 | Desai et al. | 726/6 |
| 6,832,194 | B1 * | 12/2004 | Mozer et al. | 704/270 |
| 6,848,045 | B2 * | 1/2005 | Long et al. | 726/20 |
| 6,850,252 | B1 * | 2/2005 | Hoffberg | 715/716 |
| 6,889,321 | B1 * | 5/2005 | Kung et al. | 713/153 |
| 6,901,374 | B1 * | 5/2005 | Himes | 705/14 |
| 6,904,449 | B1 * | 6/2005 | Quinones | 709/203 |
| 6,934,842 | B2 * | 8/2005 | Okamoto et al. | 713/168 |
| 7,079,640 | B2 * | 7/2006 | Mikhailov et al. | 379/230 |
| 7,092,950 | B2 * | 8/2006 | Wong et al. | 707/100 |
| 2001/0042124 | A1 * | 11/2001 | Barron | 709/227 |
| 2001/0054152 | A1 | 12/2001 | Nakao et al. | 713/182 |
| 2002/0010679 | A1 * | 1/2002 | Felsher | 705/51 |
| 2002/0016727 | A1 * | 2/2002 | Harrell et al. | 705/7 |
| 2002/0032655 | A1 * | 3/2002 | Antonin et al. | 705/43 |
| 2002/0042880 | A1 | 4/2002 | Endoh | 713/182 |
| 2002/0063154 | A1 * | 5/2002 | Hoyos et al. | 235/382.5 |
| 2002/0073066 | A1 * | 6/2002 | Coutts et al. | 707/1 |
| 2002/0073213 | A1 * | 6/2002 | Mekata et al. | 709/229 |
| 2002/0128986 | A1 * | 9/2002 | Stutz | 705/401 |
| 2002/0142831 | A1 * | 10/2002 | Mattice et al. | 463/29 |
| 2002/0149467 | A1 * | 10/2002 | Calvesio et al. | 340/5.52 |
| 2002/0174030 | A1 * | 11/2002 | Praisner et al. | 705/26 |
| 2002/0180581 | A1 * | 12/2002 | Kamiwada et al. | 340/5.2 |
| 2002/0194003 | A1 * | 12/2002 | Mozer | 704/270.1 |
| 2003/0018900 | A1 | 1/2003 | Endoh | 713/182 |
| 2003/0028798 | A1 * | 2/2003 | Burnett | 713/200 |
| 2003/0030584 | A1 * | 2/2003 | Hirata et al. | 342/357.12 |
| 2003/0046231 | A1 * | 3/2003 | Wu | 705/43 |
| 2003/0046548 | A1 * | 3/2003 | Brown et al. | 713/182 |
| 2004/0034794 | A1 * | 2/2004 | Mayer et al. | 713/200 |
| 2004/0250083 | A1 * | 12/2004 | Schwab | 713/182 |
| 2005/0273863 | A1 | 12/2005 | Nakao et al. | 726/26 |

FOREIGN PATENT DOCUMENTS

| | | |
|---|---|---|
| EP | 929023 | 4/1999 |
| EP | 0 935 182 | 8/1999 |
| EP | 1 130 497 | 9/2001 |
| EP | 1193593 | 4/2002 |
| EP | 1 320 008 | 6/2003 |
| JP | 8-235114 | 9/1996 |
| JP | 9-130532 | 5/1997 |
| JP | 11-296327 | 10/1999 |
| JP | 2001-16383 | 1/2001 |
| JP | 2001-297045 | 10/2001 |
| JP | 2002/202945 | 7/2002 |
| JP | 2002/259108 | 9/2002 |
| WO | 01/65768 | 9/2001 |

OTHER PUBLICATIONS

A Practical Approach to High Assurance Mutlilevel..—Froscher, Kang.. (1994) www.itd.nrl.navy.mil/ITD/5540/publications/CHACS/1994/1994froscher-acsac.ps.*

Randomized Communication in Radio Networks—Chlebus www.mimuw.edu.pl/~chlebus/On-line/ran-com-rad-net.ps.gz.*

Designing object-oriented synchronous groupware with..—Schuckmann, Kirchner.. (1996) ftp.darmstadt.gmd.de/pub/concert/publications/CSCW96.ps.*

Software Architecture of the Infopad System—Le, Seshan, Burghardt, Rabaey (1994) daedalus.cs.berkeley.edu/publications/mobidata.ps.gz.*

The Digital Distributed System Security Architecture—Gasser, al. (1989) www.cs.virginia.edu/~humphrey/GridComputingClass/papers/DigitalDSSArchitecture.ps.*

Parallel auditory filtering by sustained and transient channels separates coarticulated vowels and consonants Cohen, MA.; Grossberg, S.; Speech and Audio Processing, IEEE Transactions on vol. 5, Issue 4, Jul. 1997 pp. 301-318.*

The LR33020 GraphX processor: a single chip X-terminal controller Tobias, R.; Compcon Spring '92. Thirty-Seventh IEEE Computer Society International Conference, Digest of Papers. Feb. 24-28, 1992 pp. 358-363.*

Printers are dangerous Hernandez, J.C.; Sierra, J.M.; Gonzalez-Tablas, A.; Orfila, A.; Security Technology, 2001 IEEE 35th International Carnahan Conference on Oct. 16-19, 2001 pp. 190-196.*

* cited by examiner

TWO-PASS DEVICE ACCESS MANAGEMENT

This application is a continuation-in-part of U.S. application Ser. No. 10/017,438, filed on Dec. 5, 2001.

BACKGROUND OF THE INVENTION

1. Field of the Invention

The invention relates to a two-pass, or two-level, access management for network peripheral devices, and more particularly, managing access to a network peripheral device based on user privileges information at both a centralized access manager and at the network peripheral device.

2. Description of the Related Art

Networked peripheral devices are typically multifunction devices that handle functions such as printing, scanning, copying or faxing and are often relied upon in performing enterprise level tasks. Controlling usage of a networked peripheral device means that a walk-up user of the device, i.e., one that gains access to the device locally at the device, or a remote user of the device, i.e., a non walk-up user, is allowed access to only those services and/or features available on the device that are authorized. For example, a user may have access to copying but not a printing service of a networked peripheral device that offers faxing, printing, copying and scanning services. Likewise, a user may only be allowed access to a black-and-white, but not a color printing feature of the printing service offered by the device.

Controlling usage of services and/or features offered by a networked peripheral device is often necessary for economic as well as other reasons. For example, color ink cartridges containing ink for color printing typically cost significantly more than black ink cartridges that are used for black and white printing. It may therefore be desirable to limit access to color printing features of a printer in order to save costs.

One conventional approach to controlling access to a networked peripheral device by a non-enterprise user is to program each device separately as to the access privileges of the user. This approach requires presence of an input mechanism such as a keyboard or a magnetic card reader on the device through which the user logs into the device. Following login by the user, the device examines the user's access privileges, which are maintained by the device, and allows the user access to the device based on the programmed information concerning the user's access privileges. Adoption of this approach is cumbersome since it requires separate programming of each networked peripheral device and reprogramming of each device in response to changes in access policy.

Another conventional approach to controlling access to a networked peripheral device by a non-enterprise user is to program user access privileges on a keycard that is carried by the user. Upon swiping the keycard on a card reader installed on the device, the user access policy is transmitted from the card to the device. The user is then allowed to use the device in accordance with the limitations contained in the user access policy. This approach also suffers from the drawback suffered by the previous alternative in that each individual card needs to be programmed in order to encode user access policy and reprogrammed each time the policy is revised as to that user.

It would therefore be beneficial to be able to control and customize access to services and/or features of a networked peripheral device by a non-enterprise user using a centralized mechanism, which provides both enterprise user authentication and non-enterprise user authentication and access privilege information to manage device/resource usage, at the enterprise level.

SUMMARY OF THE INVENTION

The present invention addresses the above by providing a centralized level of access management to networked peripheral devices for both walk-up and remote users in order to prevent unauthorized use by a non-enterprise user of services and/or features that are available on a device based on authentication of the user at the device.

In one aspect, the invention concerns creating a context-sensitive user interface for a networked peripheral device. The user supplies authentication information to a device via any input means including, but not limited to, a keypad, a smart card, or any other input method that is supported by the device. The device communicates the authentication information provided by the user to an authentication server, which provides authentication and authorization services for both walk-up and remote for users of the device, and where networked peripheral device access policy information for users is stored. The server authenticates a user and performs a first-level check to determine the level of access of a user based on access policy information for the user. Based on the outcome of the authentication and authorization performed at the server, access management information is in turn transmitted to the device, which performs its own authorization check to determine the level of access of a user based on the received access management information.

The access policy information may concern access to a service offered by the networked peripheral device itself or to certain features of services available on the device. Upon authentication of the user by the authentication server and upon a successful first-level user access check, the information (e.g., privilege information or other access policy information) about the user's level of access to the device is passed back to the device. The device determines the user's access to services/features of the device based on the access policy information supplied by the authentication server. The device can create a customized user interface such as a customized service menu for the user that incorporates access policy information for the user. The customized service menu is then displayed on the device, allowing the user access to the determined features.

Providing a centralized location for access management information for use by a networked peripheral device in order to prevent unauthorized use of device services/features based on authentication of the user addresses the current problems associated with controlling access to a networked peripheral device by a walk-up user and eliminates the need for individual programming of each device or keycard in response to changes in access policy.

In addition, providing two levels of access management (i.e., two-pass access management) helps to conserve computing resources and allows the network peripheral to deny access to a user. A network-level authorization portion of the two-pass authorization aids in avoiding needless expenditures of network processing resources (e.g., a network client or server computer) in the preparation of data in response to a user's request where the user-requested service/feature is not authorized, and can provide early feedback to the user concerning whether or not the user can access the peripheral device. The device-level authorization portion of the two-pass authorization helps to ensure that prepared data received from the network by the peripheral does not contain instructions for performing an unauthorized service/feature.

For example, the second-level check can avoid an attempt to spoof (e.g., by altering the prepared data) to gain unauthorized access rights to services/features of the peripheral.

This brief summary has been provided so that the nature of the invention may be understood quickly. A more complete understanding of the invention can be obtained by reference to the following detailed description of the preferred embodiment(s) thereof in connection with the attached drawings.

BRIEF DESCRIPTION OF THE DRAWINGS

FIG. 4, which comprises

FIG. 11, which comprises

FIG. 13, which comprises

DETAILED DESCRIPTION OF THE PREFERRED EMBODIMENT

Figure 1:
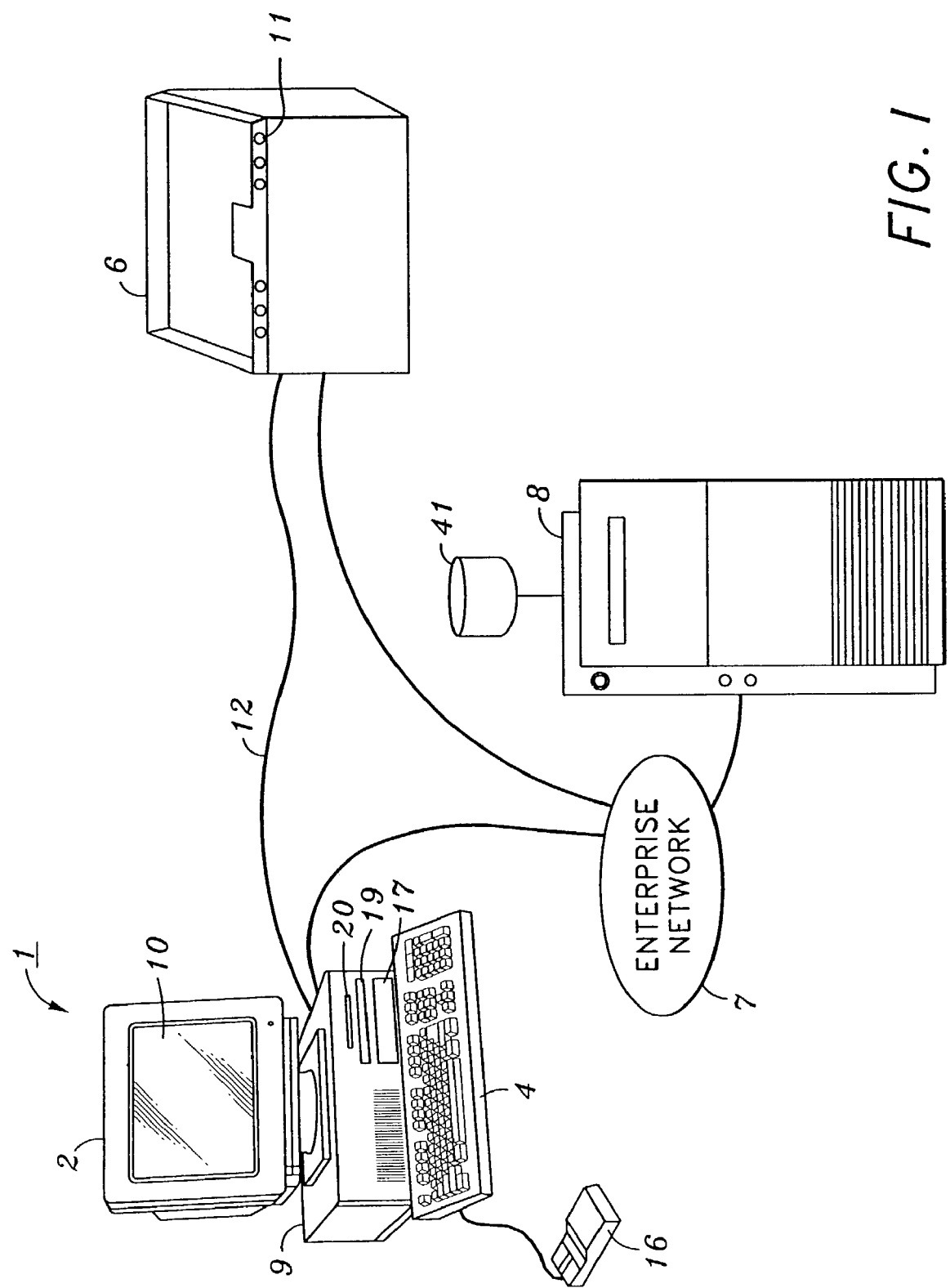
FIG. 1 is a view showing the outward appearance of a representative hardware embodying the present invention.

FIG. 1 is a view showing the outward appearance of a representative hardware embodying the present invention. Computing equipment 1 includes host processor 9 comprising a personal computer (hereinafter "PC") preferably having windowing operating system such as Microsoft Windows 2000®, Windows ME®, etc. operating system. Provided with the computing equipment 1 are color monitor 2 including display screen 10, keyboard 4 for entering text data and user commands, and pointing device 16. Pointing device 16 preferably comprises a mouse, for pointing, selecting and manipulating objects displayed on display screen 10.

Computing equipment 1 includes a computer-readable memory medium such as a fixed disk 17 and/or floppy disk drive 20 and/or CD-ROM drive 19. Such computer readable memory media allow computing equipment 1 to access information such as user-related data, computer executable process steps, application programs, and the like, stored on removable and non-removable memory media. In addition, computing equipment 1 is connected to server 8 through an enterprise network 7 and can acquire information and application programs from the server 8 through network 7. Enterprise network is preferably an Intranet but can also be a Local Area Network (LAN), a Wide Area Network (WAN) or the Internet, for example. The computing equipment 1 is connected to networked peripheral device 6 through the network 7. Device 6 includes one or more buttons 11, which may be programmable. As is discussed in more detail below, buttons 11 may be enabled or disabled by device 6 depending on the received access policy.

Like computing equipment, server 8 is a computer preferably having a windowing operating system. The server 8 has a storage device 41, which is preferably a large fixed disk for storing files. While device 41 is shown to be external to server 8, it need not be. Other devices on the network 7 can therefore use the server 8 as a file server and for storing applications such as an access controller configured to control user access to services/features available on the device 6 and an authenticator configured to authenticate a user and for storing user and device configuration information on a directory service, which are described in more detail with reference to FIG. 3, and which directory service contains such information as user account information and access policy information. The directory service is preferably a Microsoft Active Directory, which is a component of the Windows 2000® that provides directory services to a Windows environment. In addition to providing for central management and sharing of information on network resources and users, Microsoft Active Directory® acts as the central authority for network security that will be discussed below with reference to FIG. 4. It should be apparent that while the storage of authentication and access control information is discussed with reference to a directory service, any means of storing this information can be used with the present invention, including but not limited to a domain controller.

The interface between the directory service, which contains authentication and access policy information, and other components is provided by the authenticator and/or by the authenticator, components of server 8, which are responsible for authenticating users and providing access management information stored on the directory service. The authenticator and/or access controller are preferably located on server 8 with the directory service, but can also be implemented on a remote system, or server.

Figure 2:
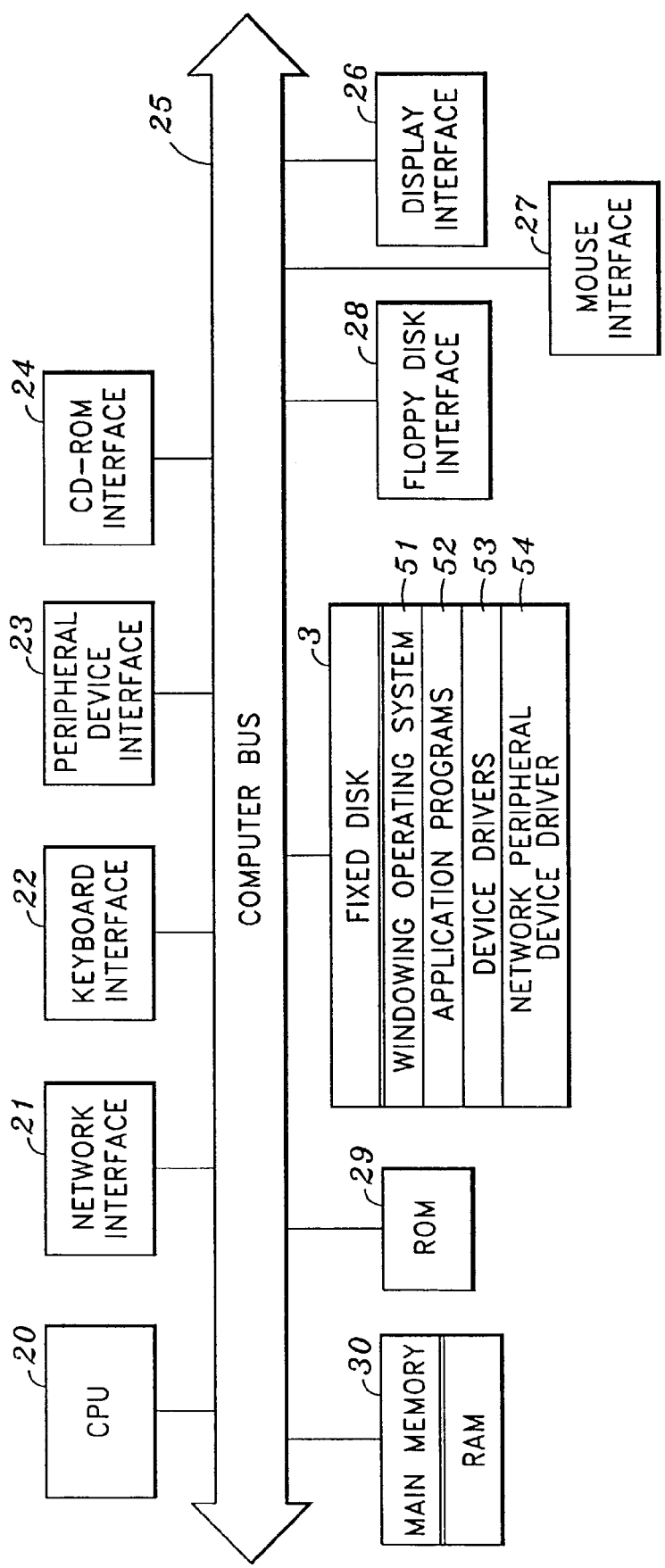
FIG. 2 is a detailed block diagram showing the internal architecture of the computer shown in FIG. 1 in accordance with the present invention.

FIG. 2 is a detailed block diagram showing the internal architecture of computing equipment 1. As shown in FIG. 2, computing equipment 1 includes central processing unit ("CPU") 20 that interfaces with computer bus 25. Also interfacing with computer bus 25 are fixed disk 3, network interface 21 for accessing network 7, random access memory ("RAM") 30 for use as main memory, read only memory ("ROM") 29, floppy disk interface 28, CD-ROM interface 24, display interface 26 to monitor 10, keyboard interface 22 to keyboard 4, mouse interface 27 to pointing device 16, and peripheral device interface 23 to a stand alone, non-networked device 6.

Main memory 30 interfaces with computer bus 25 so as to provide RAM storage to CPU 20 during execution of software programs such as the operating system, application programs, and device drivers. More specifically, CPU 20 loads computer-executable process steps from disk 3 or other memory media into a region of main memory 30, and thereafter executes the stored process steps from main memory 30 in order to execute software programs. Data can be stored in main memory 29, where the data can be accessed by CPU 20 during execution. As also shown in FIG. 2, fixed disk 3 contains a windowing operating system 51, application programs 52 such as application word processing, spreadsheet, database, imaging, graphics, etc. applications, and device drivers 53 such as networked peripheral device driver 54.

Figure 3:
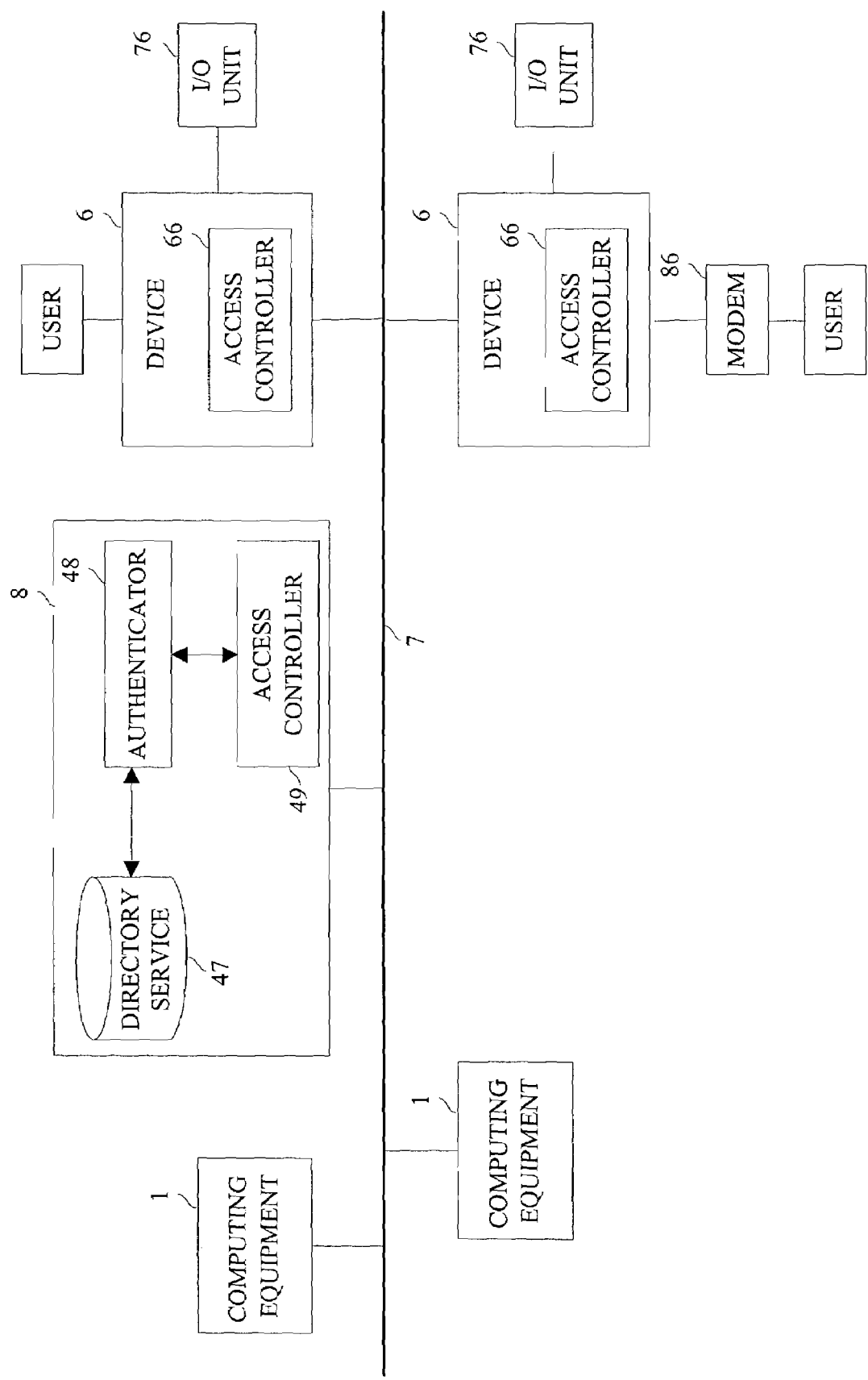
FIG. 3 is a block diagram showing an overview of components for use in managing and/or controlling access to network peripheral devices according to the present invention.

FIG. 3 is a block diagram showing an overview of components for use in managing and/or controlling access to network peripheral devices according to the present invention. Briefly, server 8 includes a host processor (not shown) that has a windowing operating system. The server 8 uses storage device 41, which is a preferably a large fixed disk for storing numerous files, to store directory service 47. Directory service 47 contains user access policy information and other information such as user authorization information. Access policy information refers to access control information (e.g., rules) that has been defined at an enterprise level concerning user access to services/features available on the networked peripheral device 6. For example, a user may have access to a copying but not a printing service of a multifunction networked peripheral device 6 that offers faxing, printing, copying and scanning services. Likewise, a user may only be allowed access to a black-and-white printing feature, but not a color printing feature, of a printing service available on the device 6.

The device 6 includes an access controller 66, which allows the user to access the device consistent with the determined level of access. Access controller is preferably an embedded computer system with an internal architecture similar to that shown in FIG. 2 including some or all of the interfaces shown. The access controller 66 controls user access to services/features available on the device 6 based on the access policy information provided to it by server 8. Access controller 66 may enforce the access policy associated with a user through creation of a user interface that is customized according to the user's level of access. Alternatively, access controller 66 may disable/enable buttons (e.g., button 11) on or displayed by, device 6. Of course, a combination of a user interface and buttons disabling/enablings may also be used. Device 6 further comprises the components needed to perform the services/features of the device 6. In a case of a multifunction device, for example, device 6 further comprising scanning, printing, faxing and copying components.

According to FIG. 3, the server 8 is connected to the computing equipment 1 and to networked peripheral device 6 through an enterprise network 7. The networked peripheral device 6 is preferably a multifunction device that offers faxing, copying, printing and scanning services but may be any type of networked peripheral device. Each of services offered by networked peripheral devices may include associated features. For example, printing may be available in color and black-and-white; scanning may be available in color, black-and-white and be available at various resolution levels. The following is an example of a structure of an enterprise access policy for use with a multi-functional networked peripheral device, which includes access/privilege information at both the service and feature levels:

| Services | Features | Policy |
|---|---|---|
| Print | B/W | Y/N |
|  | Color | Y/N |
|  | Daily Quota (Pages) | 0–2000 |
| Scan | B/W | Y/N |
|  | Color | Y/N |
|  | Resolution | L, H/L, H |
|  | Daily Quota (Pages) | 0–100 |
| Fax | Local | Y/N |
|  | Long Distance | Y/N |
|  | Resolution | H, H/L, L |
|  | Daily Quota (Pages) | 0–200 |
| Copy | B/W | Y/N |
|  | Color | Y/N |
|  | Resolution | H, H/L, L |
|  | Daily Quota (Pages) | 0–1500 |

In the above example, the print service includes black-and-white (i.e., B/W), color and daily quota features. The information under the policy column identifies whether or not the feature is available and/or a number from zero to two thousand that represents a daily quota (e.g., a number of pages) the number of pages the user is allowed. For example, a user may be limited to printing 200 pages in a single day.

In addition to features that are similar to those of the print service, the scan service is available at high (H), medium (H/L), and low (L) resolutions as indicated under the policy column (i.e., H, H/L, L). The daily quota feature for the scan service is between zero and one hundred pages. The Fax service includes local, long distance, and daily quota features. The information under the policy column identifies whether or not the feature is available and/or a number from zero to two hundred that represents the number of pages the user can fax. In addition to the features that are similar to those of the print service, the copy service is available at various H, H/L and L resolutions that are indicated under the policy column. The information under the policy column identifies whether or not the feature is available and/or a number from zero to two hundred that represents the number of pages the user can copy.

After the authenticator 48 has authenticated the user based on information stored in the directory service 47, access controller 49 determines whether the user is authorized to access the device services/features available on the device 6 based on the access policy information stored in directory service 47. While authenticator 48 and access controller 49 are shown as separate components in FIG. 3, it should be apparent that they may be the same component or may both be part of another component. In a case that authentication by authenticator 48 and access control determination by access controller 49 are successful on server 8, access policy information is transmitted to device 6. If either authentication by authenticator 48 fails or access controller 49 determines that there is a need to deny access based on the access policy associated with a user, a message indicating that authentication failed or access is denied for the particular user and/or requested services/features is sent to device 6.

Once the access policy information is received by device 6, the access controller 66 determines the user's level of access to services/features available on the device 6 based on the received access policy information. The access controller 66 preferably enforces the enterprise access policy for the user by creating a customized user experience (e.g., customized UI, customized service menu) for the user. The customized service menu is then displayed on the device 6. Input/Output (I/O) unit 76 on the networked peripheral device 6 provides the customized service menu. I/O unit 76 may be an external unit that is attached to the device 6 but may also be built into the device 6, and may provide a display unit as well as input mechanism (e.g., keyboard and/or media reader).

The customized service menu allows the user to use the determined services and/or features available on the networked peripheral device 6 in accordance with enterprise access policy information for the user. The customized service menu is preferably displayed on a touch-screen that allows the user to activate the keys by touching virtual keys that are displayed on the screen on which the menu is displayed. In such a case, the user may gain access to the device 6 by activating the virtual keys that are displayed on the I/O unit 76 corresponding to available services/features on the device 6. However, keys can also be activated through other means such as use of a pointing device 16, where I/O unit 76 comprises computing equipment 1.

Generally, the I/O unit that is used at the device 6 can be non-integrated where the input and output functions are performed by separate units. For example, I/O unit 76 may comprise a separate keypad. I/O unit can also be integrated where the same unit performs both input and output functions. For example, I/O unit may be a touch screen that displays output including virtual keys that are activated in response to the user's touch.

A user of the networked peripheral device 6 can be a walk-up user or a remote user. A walk-up user is defined as one who gains access to the device 6 locally at the device. A remote user is a non-walk-up user. In the case of the walk-up user, as discussed in more detail with respect to FIG. 4, the authentication information received by device 6 is transmitted from the device 6 to the authenticator 48 and device 6 receives access information policy from the authenticator 48. In the case of the remote user who may have already logged on to the network, device driver 54 of FIG. 2 requests access policy information that corresponds to the user and device 6 and provides authenticator 48 with user login and device information.

The authenticator 48 transmits access policy information to device driver 54. Authenticator 48 notifies device 6 of access policy associated with the authenticated user preferably along with the job, which was submitted by the user via device driver 54. If authenticator 48 is unable to authenticate a user based on the authentication information sent by device 6, it may send an "authentication failed" message or a "no services/features available," message, or both. In a case that the user is authenticated, the authenticator 48 forwards the access policy information to access controller 49, which determines based on the job request and the access policy information whether access should be granted. If so, the access policy information is transmitted along with the job request to the device 6. The device 6 then processes the job request to the extent it conforms to the access policy information. If access controller 49 determines that access should be denied, it may send an "access denied", or a "requested services/features unavailable", message, or both.

FIG. 4 illustrates a flow diagram of process steps to manage and/or control access to a networked peripheral device by a walk-up user according to the present invention. Before allowing the user to access the device 6, the request must be vouched for by a trusted application such as the authenticator 48, which is stored on the server 8. All authentication information is kept in a directory service 47 that exists on the server 8. A user initiates a job by providing authentication information to the networked peripheral device 6. The user can use any of the services that are available on the networked peripheral device 6, for which the user is authorized, and any feature corresponding to any of those services such as black-and-white or color features of a printing service, for which the user is authorized.

Since a walk-up user accesses the device directly, in step S301 a walk-up user provides authentication information to the device 6. Preferably, a single, universal sign-on functionality is in effect according to which the authentication information is the user's username and password. In any case, the same authentication information may be used to authenticate a user for other purposes (e.g., access to server 8, or files stored thereon). Advantageously, a universal sign-on avoids entry of separate, unique user names/passwords for login at the device 6 and for any other purposes for which authentication is a prerequisite.

Step S302 causes the device 6 to communicate the authentication information provided by the user to the authenticator 48, which in turn determines if the user is an authorized user. The authenticator 48 accomplished this in step S303 by comparing or testing the authentication information provided by the user to user authentication information (e.g., user name and/or password) stored in directory service 47.

Step S304 determines whether the user has been successful or unsuccessful in obtaining authentication from the authenticator 48. If the user is unsuccessful in obtaining authentication for the job request, the authenticator 48 preferably communicates this failure through an "authentication failed" message that is transmitted to the device 6 per step S305. If the user is successful in obtaining authentication, then in step S306 the authenticator 48 retrieves access policy information from directory services 47. The access policy information retrieved for a walk-up user may be the same as or different from the user's enterprise access policy information, which may also be stored directory services 47.

In step S307, access controller 49 examines the walk-up user's level of access to services/features using the retrieved access policy information. In step S308, a determination is made whether to allow the user to access device 6, and in particular the services/features needed to perform the job requested by the user. If access is not to be allowed, processing continues in step S309 to transmit an "access denied" message to device 6. If server 8 determines that the user is allowed to have access, processing continues in step S310 to transmit the access policy to device 6.

In other words, the server 8 performs an authorization check in a first pass, and if the check is successful (i.e., the server allows the user access), the server 8 forwards the access policy information to device 6 so that it can perform the second, and final, check to determine whether the user is able to access features/services of device 6.

The communication between the device 6 and the server 8 is preferably conducted via a secure communication channel that uses a secure transport protocol such as secure socket layer (SSL), transport layer security (TLS) to minimize chances of unauthorized access to the device by hackers. In addition, the access control information is preferably stored in an encrypted form using a cryptographic algorithm. A cryptographic hashing and signing operation can be used to detect unauthorized modification, or tampering, to the access information. Encrypted access information is decrypted when received by device 6. If a cryptographic hashing and signing operation is used, device 6 can verify the hash in an effort to determine whether or not the received access control information has been tampered with. In addition, device 6 may encrypt authentication information and/or use a cryptographic hashing and signing operation for transmitting the authentication information to server 8.

Although the encryption is preferably performed such that the information stored at the directory service 47 is encrypted, it can alternatively be stored in non-encrypted form at the directory service 47. Accordingly, access policy information is stored in a non-encrypted form at the directory service 47 and is encrypted at the authenticator 48. Propriety protocols for communications between the server 8 and the device 6, and use of propriety secure transport mechanisms in connection with standard protocols is also contemplated for use with the present invention.

Once the device 6 obtains the user access policy information from the authentication server 8, the access controller 66 proceeds in step S311 to determine user access to services and/or features offered by the device 6 based on the access policy information received from the authenticator 48. The following is an example of user access policy information for a multi-functional networked peripheral device:

| Services | Features | Policy |
|---|---|---|
| Print | B/W | Y |
|  | Color | Y |
|  | Daily Quota | 150 |
| Scan | B/W | Y |
|  | Color | N |
|  | Resolution | L |
|  | Daily Quota | 50 |
| Fax | Local | Y |
|  | Long Distance | N |
|  | Resolution | H/L, L |
|  | Daily Quota | 25 |
| Copy | B/W | Y |
|  | Color | N |
|  | Resolution | H, H/L, L |
|  | Daily Quota | 500 |

In the above example, user is allowed to use both black-and-white and color features of the print service up to a daily maximum of 150 pages. The user can use the scan service for scanning up to 50 pages of black-and-white pages per day at low resolution, fax up to 25 pages a day as long as the faxes are not transmitted over long distance telephone line, and are transmitted at medium or low resolution, and can use the copying service to make up to 500 black-and-white copies a day at all resolutions.

In step S312 the user is allowed access to services/features of the device 6 consistent with the determined level of access. This may be implemented by the access controller 66 through creation of a user interface, which includes selections based on the access policy information obtained for the particular user. Accordingly, the device 6 creates a customized user interface such as a customized service menu for the user that incorporates the access policy for the user. The customized service menu is then displayed on the device 6 with services/features appearing as virtual keys on the I/O unit 76.

FIGS. 5–9 are views of the display screen 10 showing changes in a UI at various stages of a walk-up user's interaction with the device 6.

Figure 5:
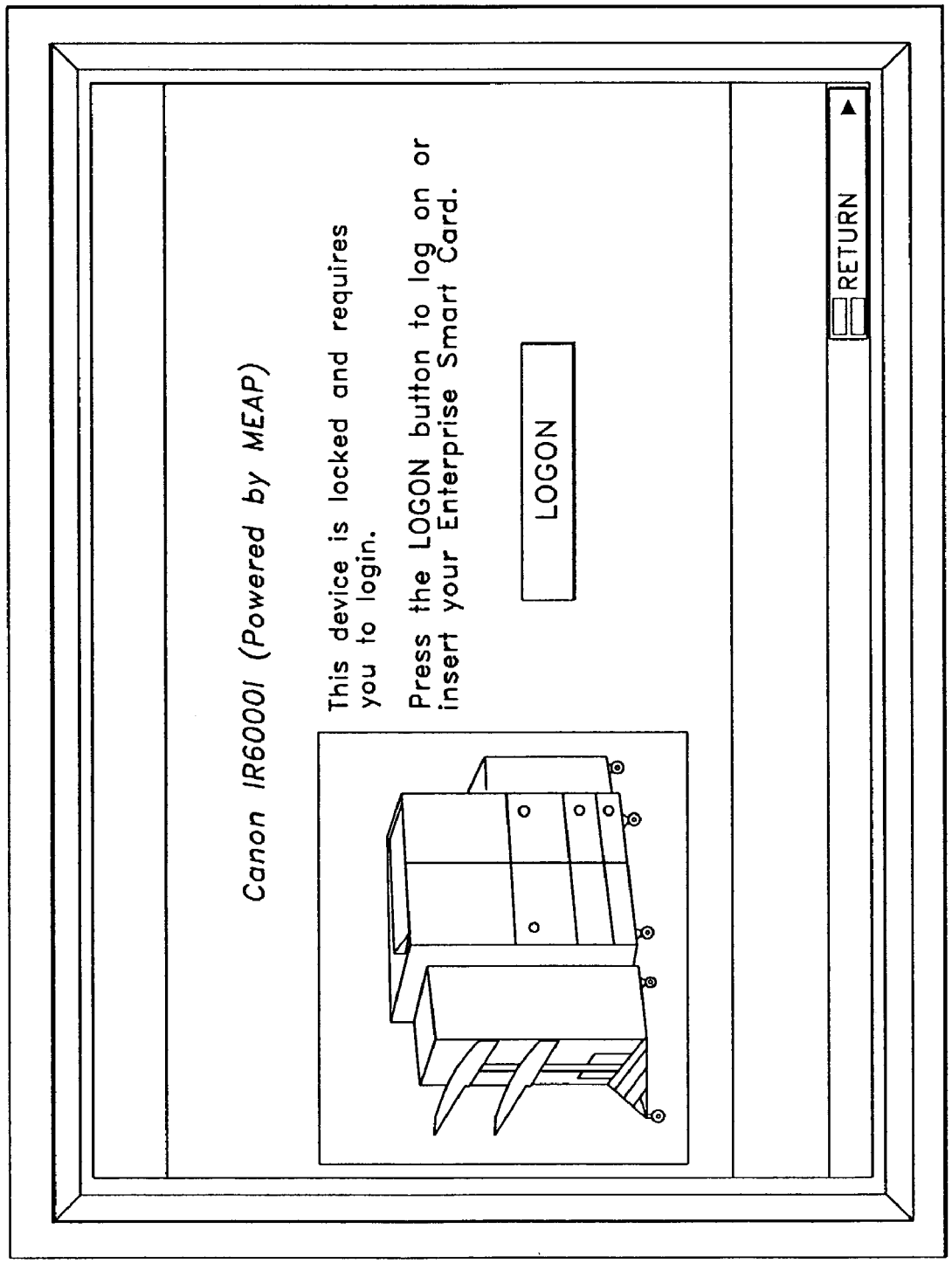
FIG. 5 is a screen shot of the display screen showing a UI at a stage prior to walk-up user login to the device.

FIG. 5 is a screen shot of the display screen showing a UI before user seeks access to the device 6. As indicated, the device is locked and requires the walk-up user to log in.

Figure 6:
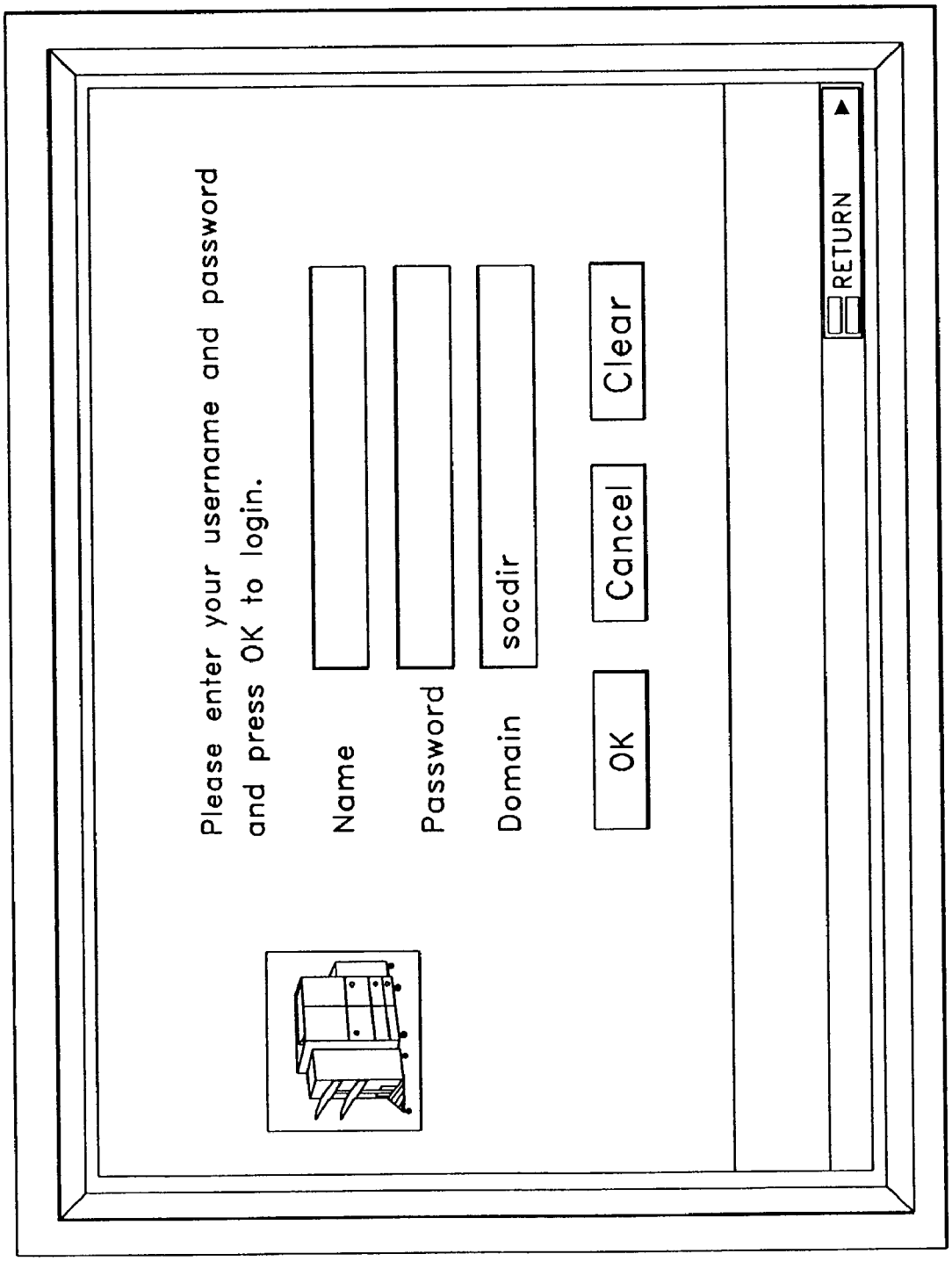
FIG. 6 is a screen shot of the display screen showing a UI through which a walk-up user would log into the device.

FIG. 6 is a screen shot of the display screen showing a UI through which user would log in to the device 6. In the example of FIG. 6, the user logs in by providing a username and password, which are transmitted in a secure manner to server 8.

Figure 7:
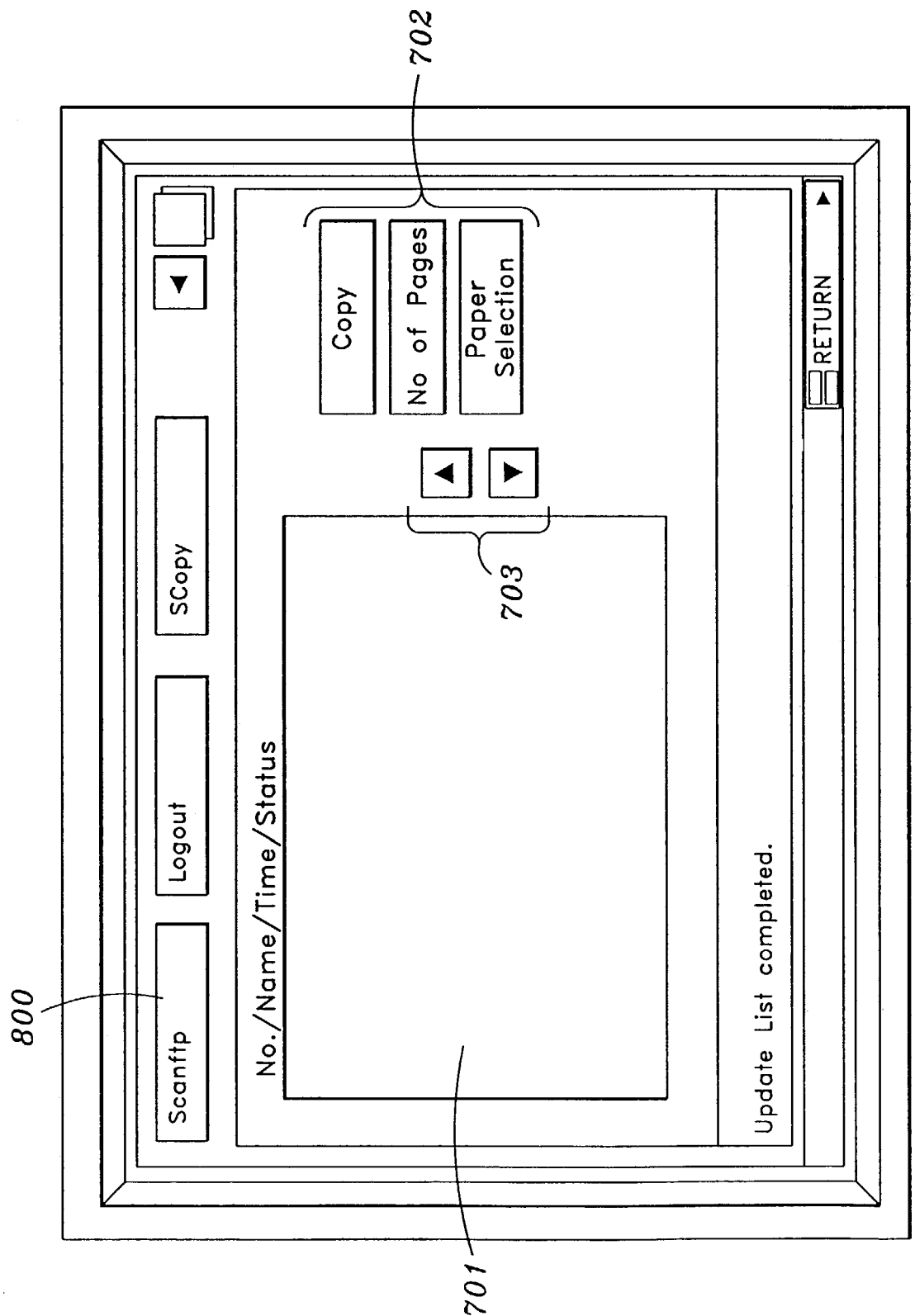
FIG. 7 is a screen shot of the display screen showing a customized service menu corresponding to services/features available to a walk-up user.

FIG. 7 is a screen shot of the display screen showing a customized service menu corresponding to services/features available to a walk-up user. Buttons 800 at the top of the screen are preferably virtual (i.e., non-physical) buttons. In this case, they represent the services of device 6 that are available to the user (i.e., scanftp, logout, scopy). The portion below buttons 800 is area 701, which is a display of a job corresponding to the "scopy" service. The scopy service allows the user to scan and copy using device 6. The virtual buttons 702 on the right hand side of the screen correspond to available features (copy, number of pages, paper selection). That is, the user can copy, set the number of pages and select paper using buttons 702. Scroll buttons 703 allow the user to scroll through the job listings displayed in area 701.

Figure 8:
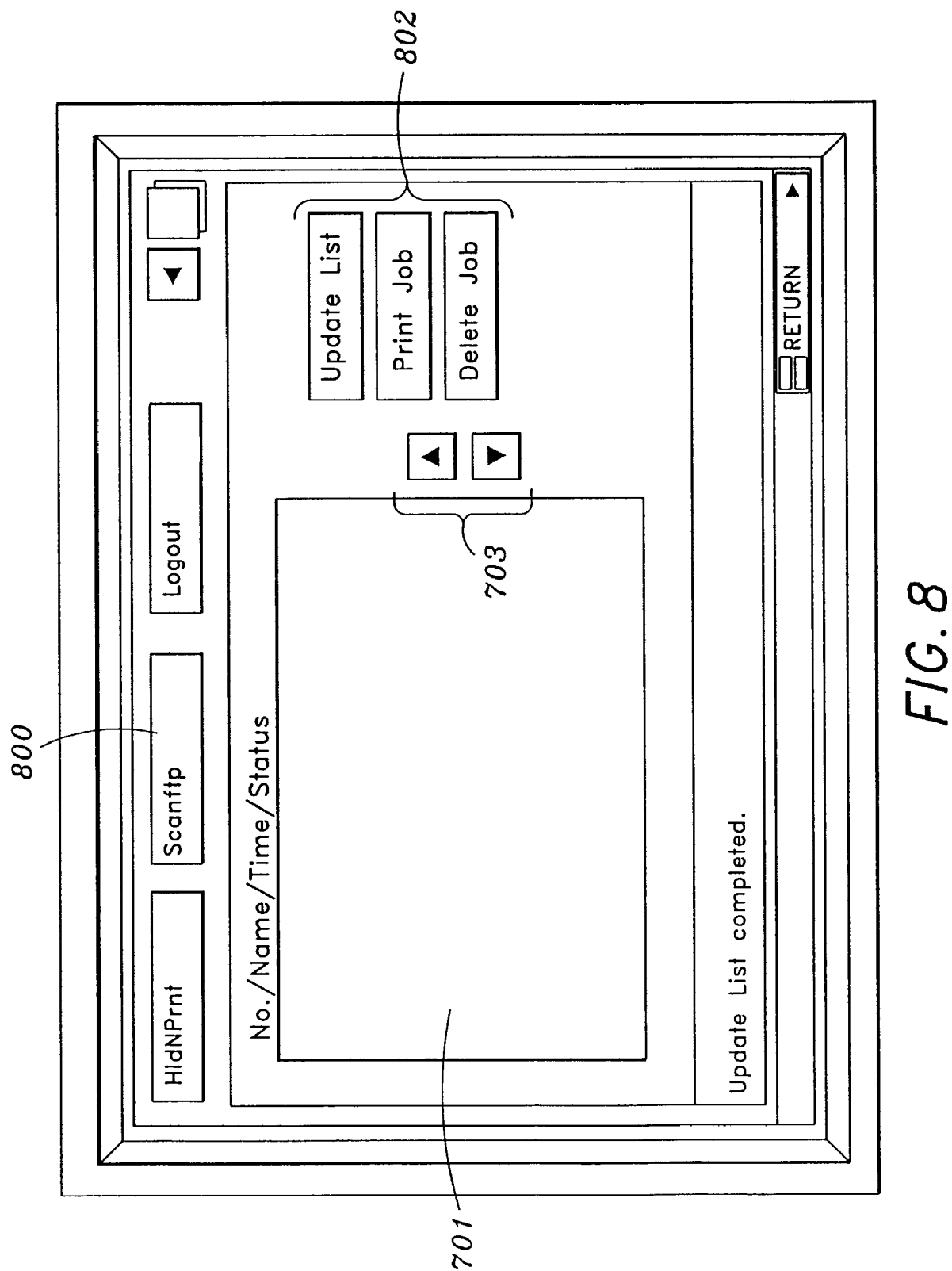
FIG. 8 is a screen shot of the display screen showing another customized service menu corresponding to services/features available to a walk-up user.

FIG. 8 is a screen shot of the display screen showing another example of a customized service menu corresponding to services/features available to a walk-up user. In the example of FIG. 8, area 701 corresponds to a "Hold&Print" service of the device 6 and provides a list of "Hold&Print" jobs. The screen includes buttons 800, which, in this case, correspond to the "Hold & Print", "Scan FTP", and "Logout" services of device 6. The "Hold&Print" service allows the user to store-up print jobs and to initiate printing of a stored job at device 6. The virtual buttons 802 on the right hand side of the screen correspond to available features (update list, print job and delete job). That is, the user can update/refresh list, print a job, or delete a job using buttons 802. Scroll buttons 703 allow the user to scroll through the job listing displayed in area 701.

Figure 9:
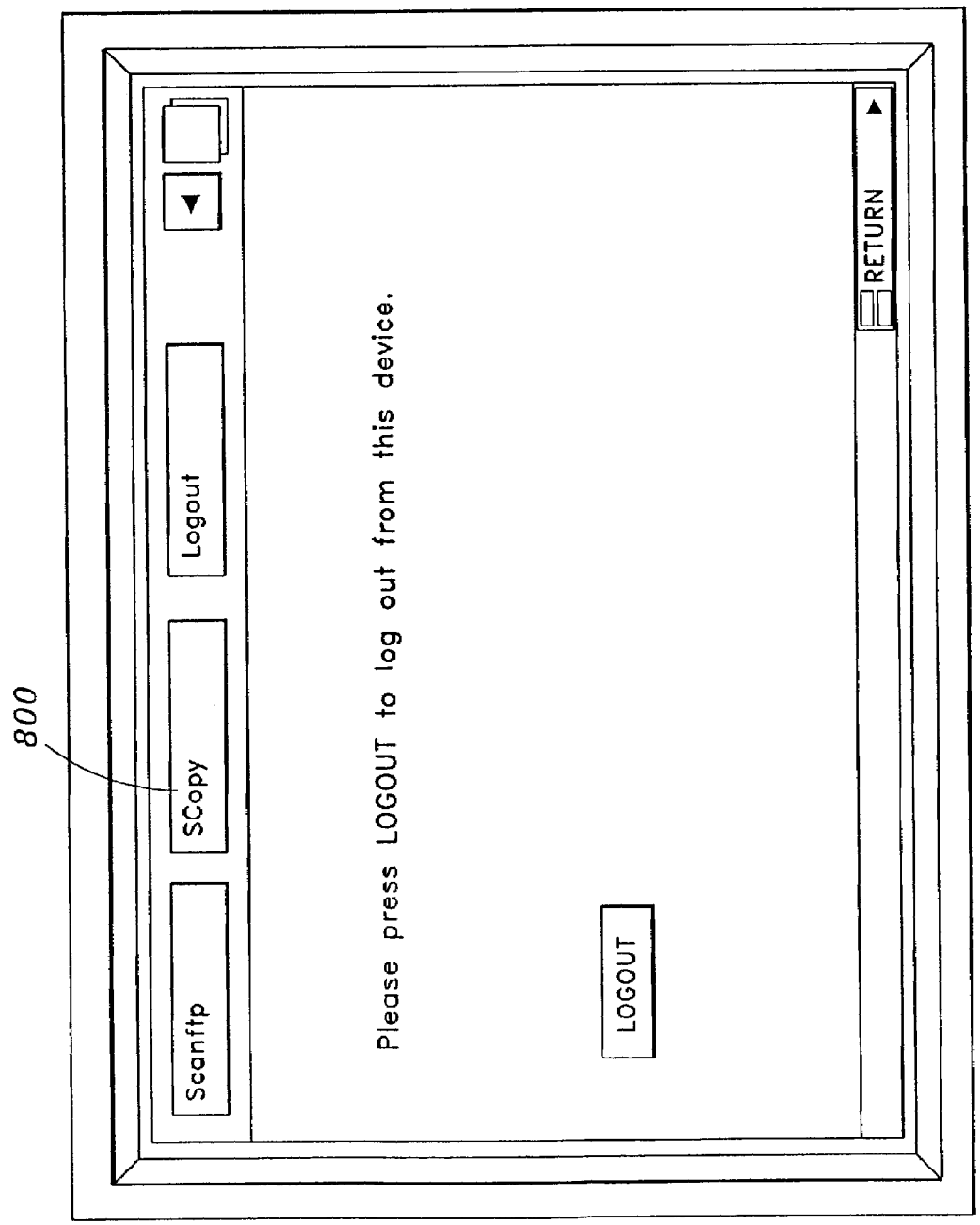
FIG. 9 is a screen shot of the display screen showing a UI through which walk-up user would log out of the device.

FIG. 9 is a screen shot of the display screen showing a UI though which walk-up user would log out of the device 6. Similar to FIG. 8, the screen includes buttons 800, which, in this case, correspond to the "Scan FTP", "scopy", and "Logout" services of device 6.

In a case that the UI includes "unauthorized" selections, these selections may be disables such that the keys corresponding to unauthorized services/features are grayed out. The user then proceeds to use the device 6 in accordance with the determined level of access by activating non-grayed out keys that are displayed on the I/O unit 76 preferably through a touch screen.

Figure 10:
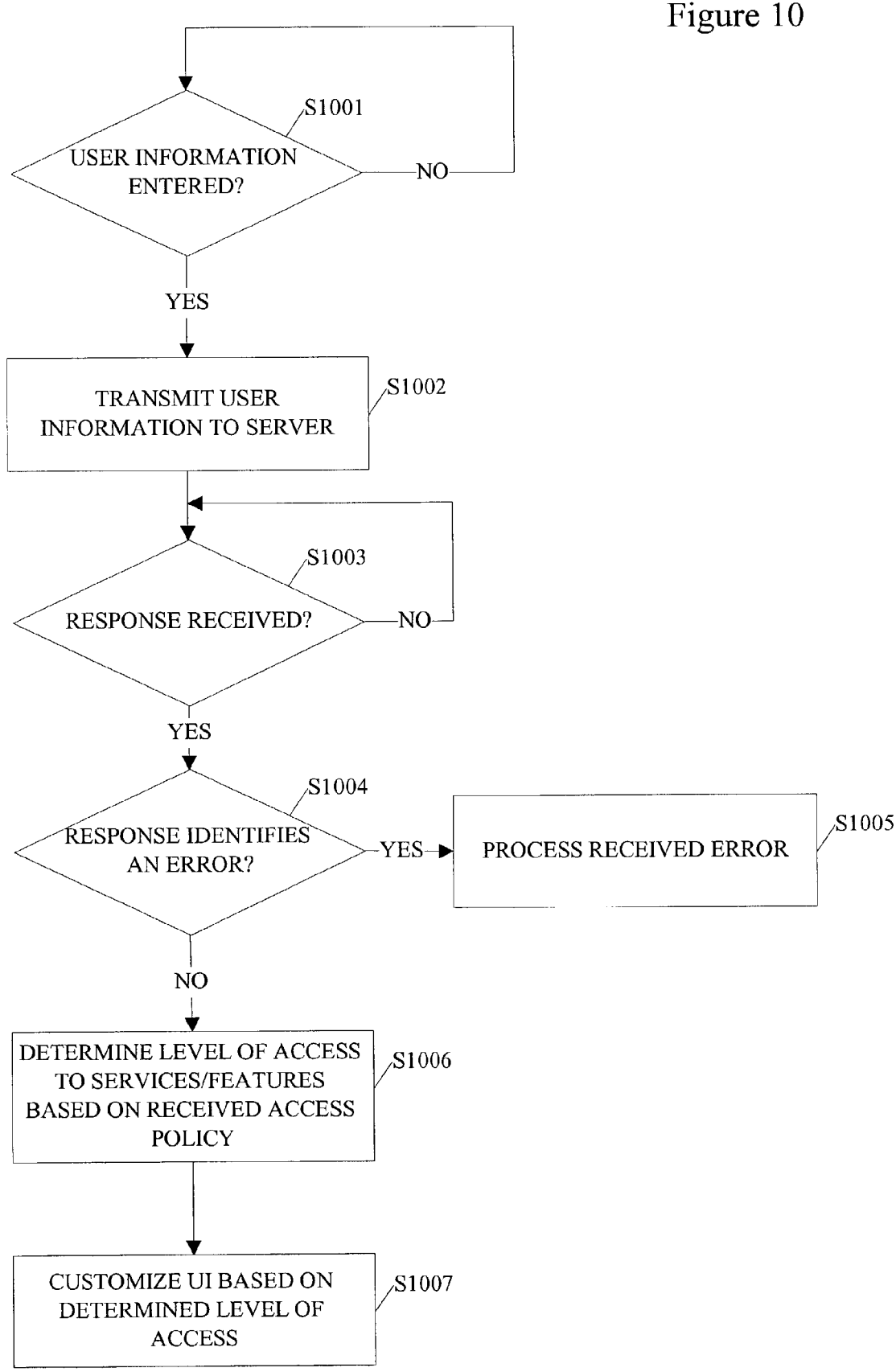
FIG. 10 illustrates a flow diagram of process steps of a networked peripheral device for customizing a user interface based on access control information to manage and/or control access to the device by a walk-up user according to the present invention.

FIG. 10 illustrates a flow diagram of process steps of a networked peripheral device for customizing a user interface based on access control information to manage and/or control access to the device by a walk-up user according to the present invention. In step S1001 the device 6 inquires into whether user has provided authentication and any job request information to the device 6 (e.g., authentication information received via the screen depicted in FIG. 6). A job is not initiated by the device until such information is provided by the user. After such information is provided, the user can request a job to be performed using services/features of device 6 (e.g., via the screens depicted in FIGS. 7 to 9). In order for device 6 to perform the user's job request, server 8 must successfully authenticate the user and successfully perform server-side authorization, and device 6 performs its authorization pass, which must also be successful.

Figure 4A:
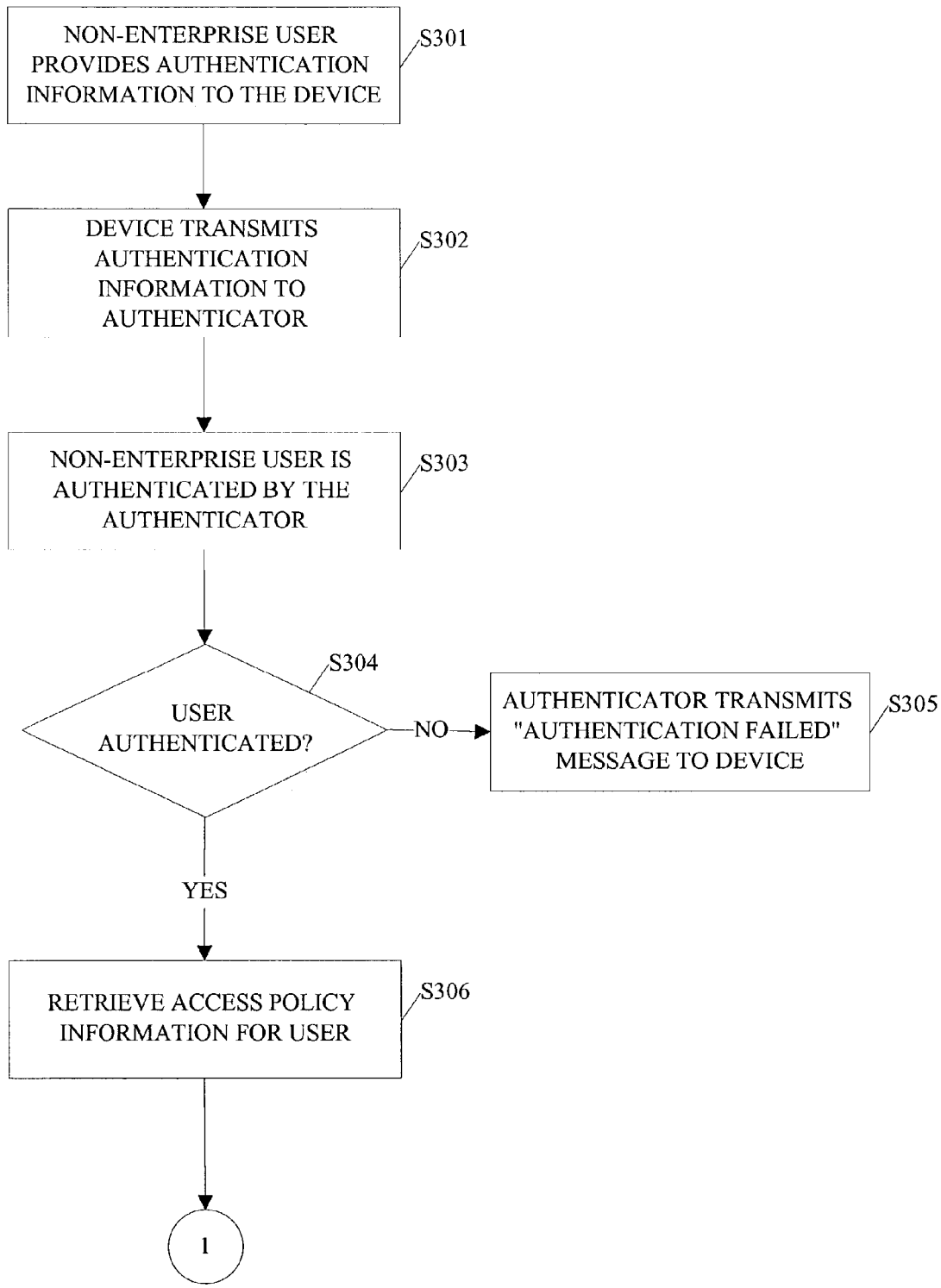
FIGS. 4A and 4B, illustrates a flow diagram of process steps to manage and/or control access to a networked peripheral device by a walk-up user according to the present invention.
Figure 4B:
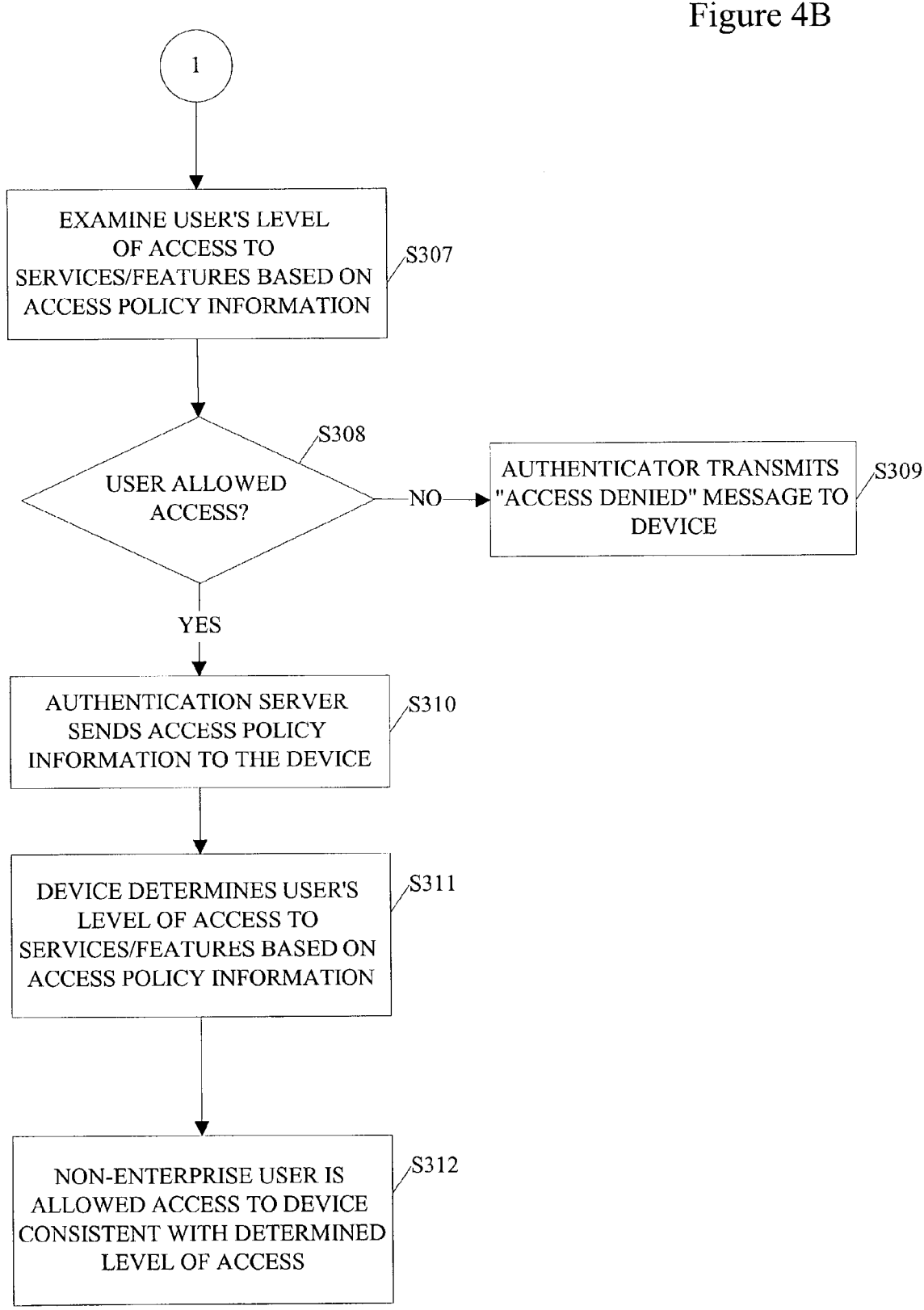

Step S1002 causes the authentication and any job request information entered by user in step S1001 to be forwarded to authenticator 48. For example, once device 6 transmits the information to server 8 in step S1002, steps S303 to S310 of FIGS. 4A and 4B are performed at server 8. The authenticator 48, compares or tests the authentication information provided by the user against authentication information stored in the directory service 47, and access controller 49 determines whether or not to allow access, and the results are transmitted back to the device 6. With respect to authorization, access controller 49 may examine job request information if supplied to determine whether access for the particular job is to be allowed, and if no job request information is received at server 8, access controller 49 can determine whether or not the user has access to any of the services/features of device 6.

In step S1003, device 6 awaits the results from the server 8. Step S1004 inquires into the user's success in being authenticated and whether the user was given some level of access to services/features of device 6 by the authenticator 48 and access controller 49, respectively, based on the results received from server 8. For example, in a case that either authentication or authorization is unsuccessful, server 8 forwards a message indicating the error to device 6.

Should the user be unsuccessful in obtaining authentication/authorization, the error message received from server 8 is processed by device 6 in step S1005 by, for example, causing an "authorization failed" or "access denied" message to be displayed by the device 6, thus denying the user access to any service/features of the device 6. In case of successful authentication/authentication of the user by server 8, the device 6 determines the user's level of access to the services/features of the device 6 based on the received access policy information per step S1006. Step S1007 causes the device 6 to create a customized menu for the user based on the determined level of access.

A remote user may access device 6, for example, via a workstation such a computing equipment 1. However, the process in which a remote user accesses device 6, differs from that of a walk-up user. The following example concerns a remote user who seeks to print a job using device 6 from a workstation and an application that exists on the workstation:

1. The user initiates a print operation from within the application.
2. Device 6 determines the server 8 on which the authenticator 48 is running.
3. A secure pipe is created between the print driver and the authenticator 48, in which the authentication information is sent to server 8.
4. The device driver 54 on the workstation transmits a request to server 8 for access policy information. The request identifies the user and device 6. Driver 54 also provides authentication information and any job request information in conjunction with the request.
5. Authenticator 48 performs authentication access controller 49 performs authorization, and based on the outcome of authentication/authorization transmits a response (e.g., "authorization failed" or "access denied" message, or access policy information) to device 6.
6. Driver 54 forwards the received access policy information to device 6 along with the job submitted by the user.

Figure 11A:
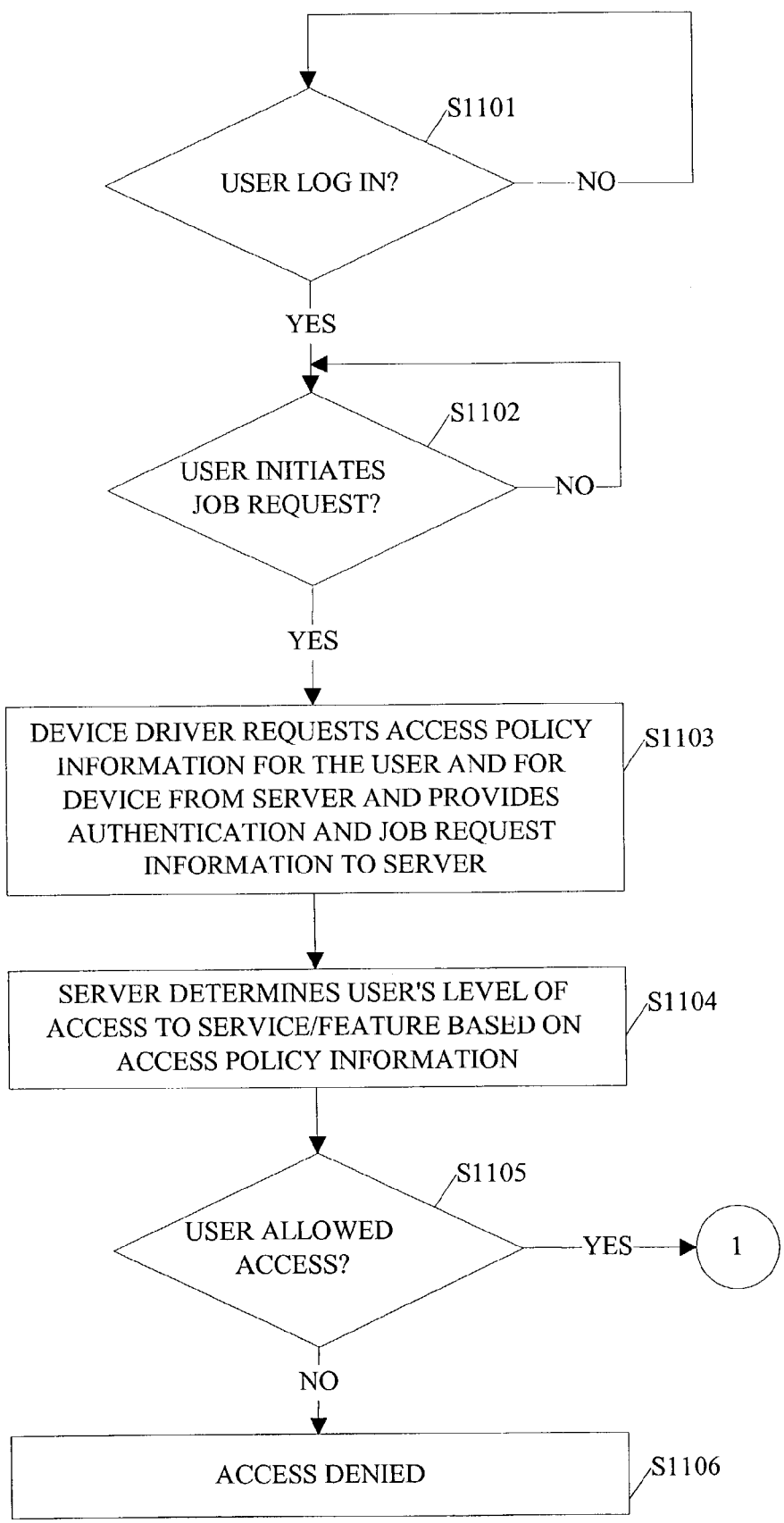
FIGS. 11A and 11B, illustrates a flow diagram of process steps to manage and/or control access to a networked peripheral device by a remote user according to the present invention.
Figure 11B:
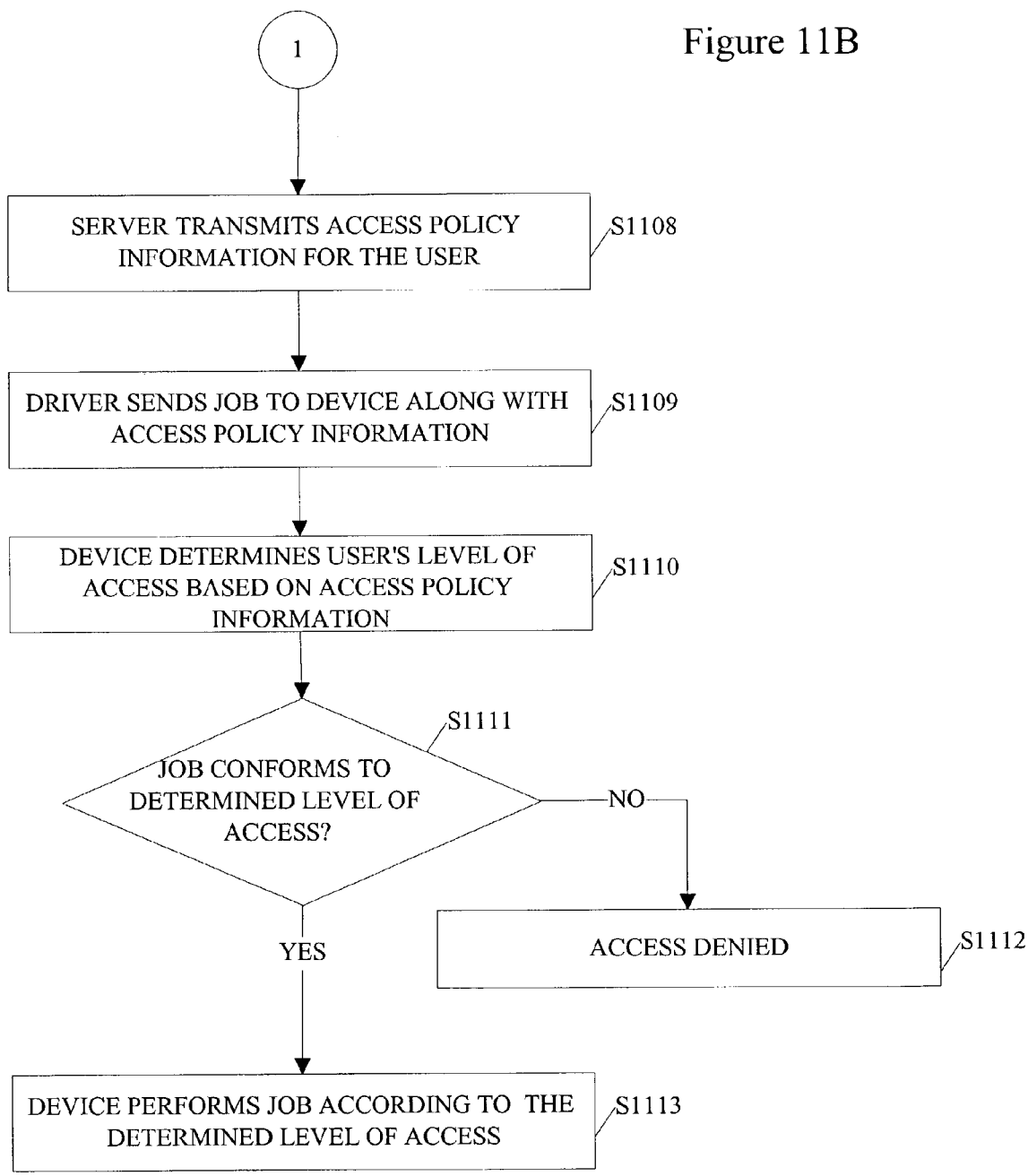

FIG. 11 illustrates a flow diagram of process steps to manage and/or control access to a networked peripheral device by a remote user according to the present invention. The user logs into the network 7 in step S1101. At step S1102 a determination is made as to whether the user has initiated a job request. Once the job request is initiated, device driver 54 requests access policy information that corresponds with the user and the device from server 8 and provides authentication and job request information to the server 8, per step S1103. Authentication information is preferably provided via a challenge and response mechanism, but can also be provided through other means such as user's username and password.

Prior to providing the requested access policy information, server 8 (e.g., authenticator 48 and access controller 49 of server 8) authenticates the user using the authentication information and determines whether the user has the level of access needed to use the service/features requested by the job request, per step S1104. In step S1105, server 8 determines whether either of the authentication and authorization was unsuccessful, and if so sends an appropriate message (e.g., an "authorization failed" or an "access denied" message). If both authentication and authorization were successful, processing continues with step S1108.

In step S1108, the server 8 sends access policy information back to the driver. Step S1109 causes the driver to forward the access policy information along with the job request to the device 6. In step S1110, the device 6 determines the user's level of access based on the received access policy information. In step S1111, the device 6 compares or tests the requested services/features against the user's level of access to determine whether the user's request conforms to the user's level of access.

A determination that the user's job request does not conform to the user's determined level of access, results in an "access denied" condition, per step S1112, thus denying the user's job request. Preferably, a message is sent to the user's workstation to alert the user of the "access denied" condition. Should the inquiry in step S1111 result in the determination that the user's job request does conform to the user's determined level of access, then step S1113 causes the device 6 to perform the requested job in accordance with the determined level of access.

Figure 12:
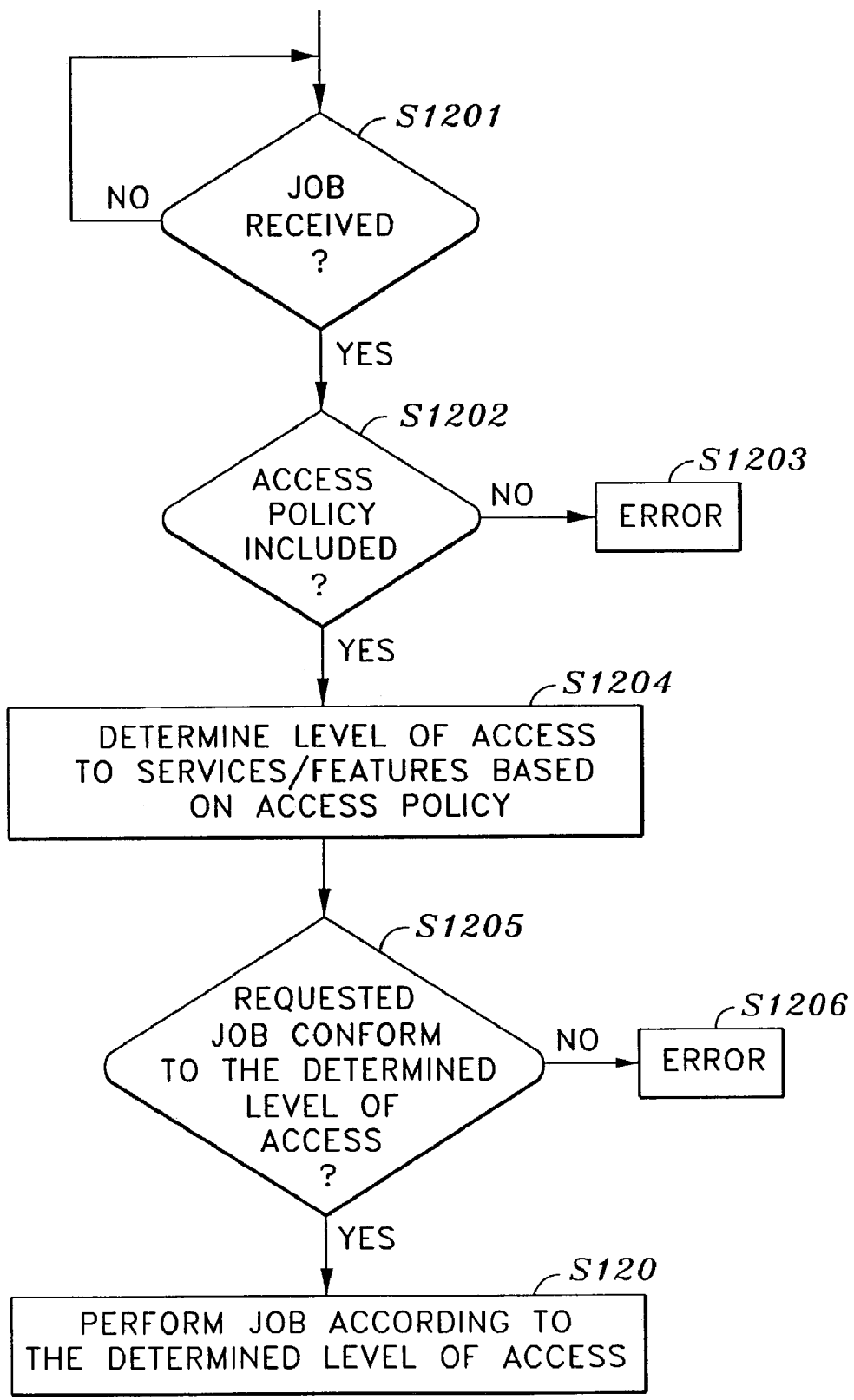
FIG. 12 illustrates a flow diagram of process steps of a networked peripheral device to manage and/or control access to the device by a remote user according to the present invention.

FIG. 11 provides a general overview of steps performed to control/manage access to device 6. FIG. 12 illustrates the perspective of device 6. That is, FIG. 12 illustrates a flow diagram of process steps for a networked peripheral device to manage and/or control access to the device by a remote user according to the present invention. In order to process a job that is remotely sent to a device 6, the device 6 needs to have both the requested services/features and the access policy information for the user. The job that is submitted by the user identifies the requested services/features. Device driver 54 provides the access policy information, which it received from server 8 as part of the job stream sent to device 6.

In step S1201, device driver 54 forwards the user's job to the device 6. The device 6, per step S1202, asks whether the user's access policy information is included along with the job request. If user's access policy information is not included along with the job request, then step S1203 causes an error message to be sent back to the driver 54, denying the user access to the requested services/features.

If the user's access policy information is included along with the job request, then step S1204 proceeds to determine the user's level of access based on the received access policy information. In step S1205, the device 6 compares or tests the requested services/features against the user's level of access to determine whether the user's request conforms to the user's level of access. A determination that the user's job request does not conform to the user's determined level of access, results in an error message, per step S1206, that is sent to driver 54, thus denying the user's job request. Should the inquiry in step S1205 result in the determination that the user's job request does conform to the user's determined level of access, then step S1207 causes the device 6 to perform the requested job.

Server 8 is configured to provide access policy information for a walk-up user and preferably for all enterprise users (i.e., walk-up and remote users) once the user has been authenticated by server 8.

Figure 13A:
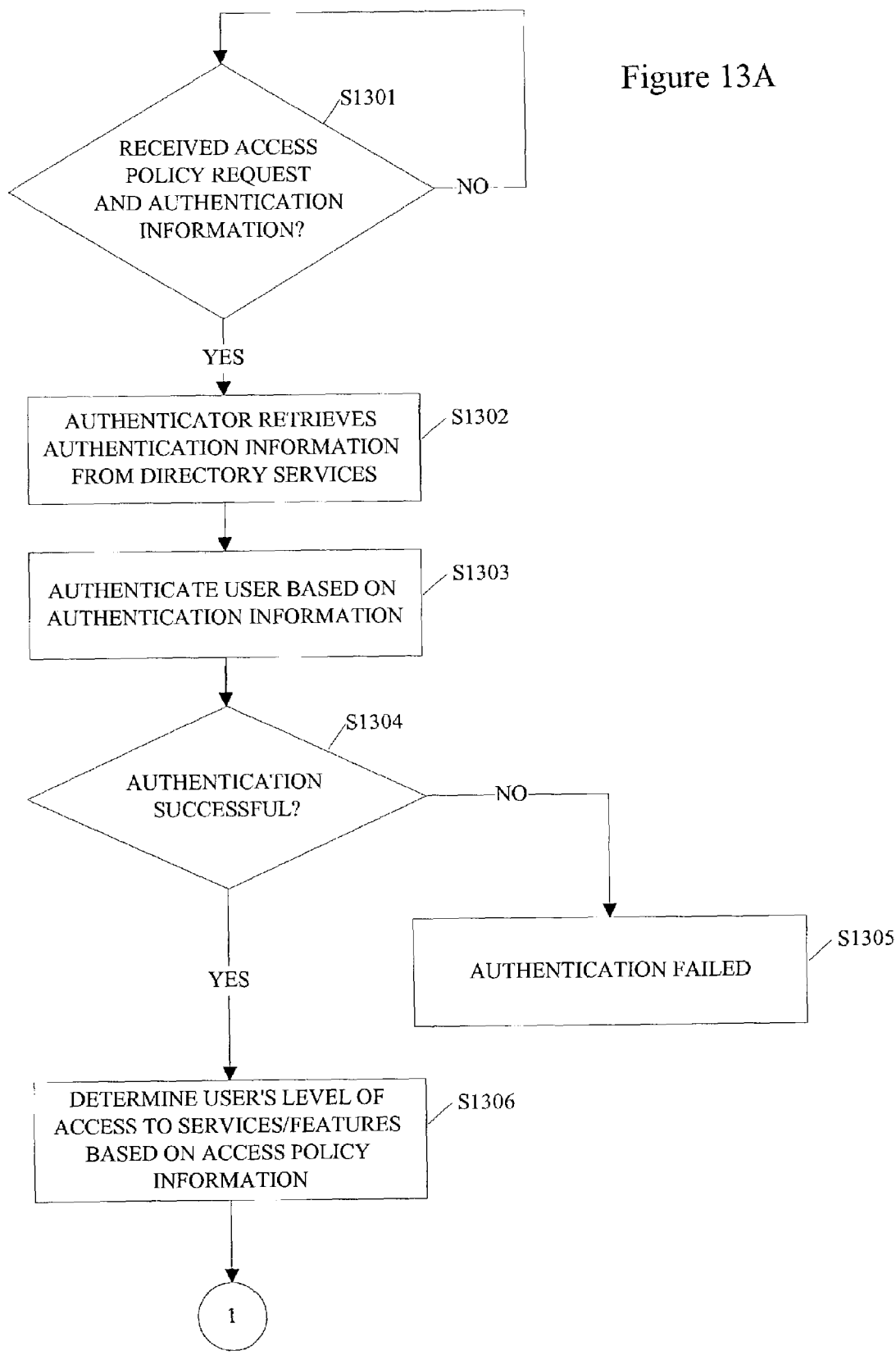
FIGS. 13A and 13B, illustrates a flow diagram of process steps of a server to manage and/or control access to the device by a remote user or a walk-up user according to the present invention.
Figure 13B:
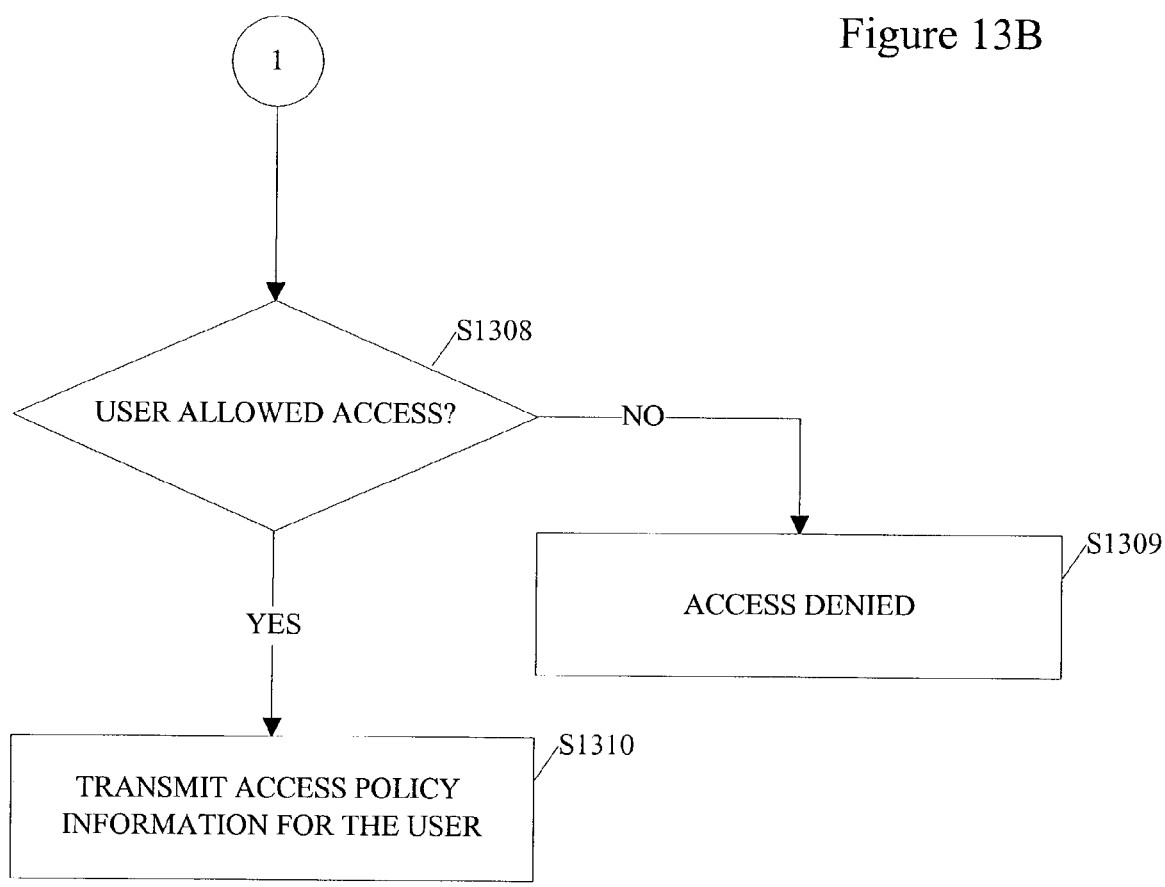

FIG. 13 illustrates a flow diagram of process steps of a server to manage and/or control access to the device by a remote user or walk-up user according to the present invention. In step S1301, server 8 awaits an-access policy request along with authentication and job request information from the device 6 or driver 54. In step S1302 the authenticator 48, located on the server 8, retrieves authentication information from directory service 47. In step S1303, the retrieved information is compared or tested against the user authentication information received per step S1301. Step S1304 inquires into whether user has been successfully authenticated. If the user is unsuccessful in obtaining authentication then step S1305 causes an "authentication failed" message to be sent from the server 8. If the user is successfully authenticated, access, then the user's level of access to services/features is determined based on access policy information, per step S1306. In step S1308, a determination is made whether or not the user is allowed access to the services/features requested by virtue of the job request, and if the user access is insufficient, then step S1309 causes an "access denied" message to be sent from the server 8. If it is determined that the user has a sufficient level of access to the device 6, then step S1310 causes the user's access policy information to be sent from the server 8.

Server 8 may reside locally with respect to device 6, computing equipment 1, or both. In a case that the network 7 is the Internet, for example, server 8 may be remotely located with respect to device 6, computing equipment 1, or both. Even where server 8 is local, it may be preferable to use a trusted architecture in which access policy information, that is received from server 8 can be trusted.

While the invention is described above with respect to what is currently considered its preferred embodiment, it is to be understood that the invention is not limited to that described above. To the contrary, the invention is intended to cover various modifications and equivalent arrangements within the spirit and scope of the appended claims.

What is claimed is:

1. A method for controlling access to a peripheral device by a user, wherein the peripheral device is accessible by the user based on centralized access management information accessible by a server, the method comprising:
   authenticating a user of a computer based on authentication information corresponding to the user;
   determining, at the server, whether the user is authorized to use at least one portion of features and/or services of the peripheral device;
   transmitting access management information for the user from the server to the computer, in case that authentication of the user is successful and the user is authorized to use at least one portion of the features and/or services of the peripheral device;
   transmitting the access management information for the user and a job requested by the user from the computer to the peripheral device;
   determining, at the peripheral device, whether a level of access to the peripheral device available to the user based on the transmitted access management information provides access to a feature and/or a service necessary to perform the job requested by the user; and
   performing the job requested by the user at the peripheral device in a case that the level of access provides access to the feature and/or service necessary to perform the job requested by the user.

2. A method according to claim 1, wherein the peripheral device is a multifunction peripheral device.

3. A method according to claim 1, further comprising the steps of:
   receiving, at the server, the authentication information from the computer,
   wherein the access management information is transmitted from the server to the computer after the server authenticates the user based on the received authentication information.

4. A method according to claim 3, wherein the authentication information received from the computer is encrypted.

5. A method according to claim 1, wherein the access management information is supplied by an authentication server that authenticates both a walk-up user who operates the peripheral device and a remote user of the computer.

6. A method according to claim 1, wherein the authentication information is a username and/or password.

7. A method according to claim 1, wherein the access management information is encrypted or a cryptographic hashing and signing operation is used for the access management information.

8. A method according to claim 1, further comprising the step of:
   transmitting from the server to the computer a message for denying the access by the user, in case that the user has no access to the peripheral device.

9. A method according to claim 1, wherein the access management information identifies a feature and/or a service which the user can use.

10. A server for use in controlling access to a peripheral device by a user, wherein the peripheral device is accessible by the user based on access management information accessible by the server, the server comprising a processor executing steps of:
    receiving authentication information corresponding to a user, from a computer for transmitting a job to the peripheral device;
    authenticating the user using the authentication information;
    determining whether the user is authorized to use at least one portion of features and/or services of the peripheral device; and
    transmitting access management information for the user to the computer, in case that authentication of the user is successful and the user is authorized to use at least one portion of the features and/or the services of the peripheral device,
    wherein the transmitted access management information is used to determine whether a feature and/or a service of the peripheral device necessary to perform the job is available to the user.

11. A server according to claim 10, wherein the processor executes the step of:
    transmitting a message for denying the access by the user in case that either authentication of the user failed or the user has no access to features and/or services of the peripheral device.

12. A server according to claim 10, wherein the processor executes the steps of:
    receiving from the peripheral device authentication information corresponding to a second user;

authenticating the second user using the authentication information corresponding to the second user; and transmitting access management information for the second user to the peripheral device, in case that authentication of the second user is successful and the second user is authorized to use at least one portion of the features and/or the services of the peripheral device.

13. A server according to claim 10, wherein the access management information identifies a feature and/or a service of the peripheral device which the user can use.

14. A method for controlling access to a peripheral device by a user, wherein the peripheral device is accessible by the user based on centralized access management information accessible by a server, the method comprising:

receiving, at the server, authentication information corresponding to a user, from a computer for transmitting a job to the peripheral device;

authenticating, at the server, the user using the authentication information;

determining, at the server, whether the user is authorized to use at least one portion of features and/or services of the peripheral device, and transmitting, at the server, access management information for the user to the computer in case that authentication of the user is successful and the user is authorized to use at least one portion of the features and/or the services of the peripheral device, wherein the transmitted access management information is used to determine whether a feature and/or a service of the peripheral device necessary to perform the job is available to the user.

15. A method according to claim 14, wherein the access management information identifies a feature and/or a service which the user can use.

* * * * *